Jan. 7, 1941.  T. V. BUCKWALTER  2,227,436
METHOD OF MAKING AXLES
Filed June 10, 1931  2 Sheets-Sheet 1
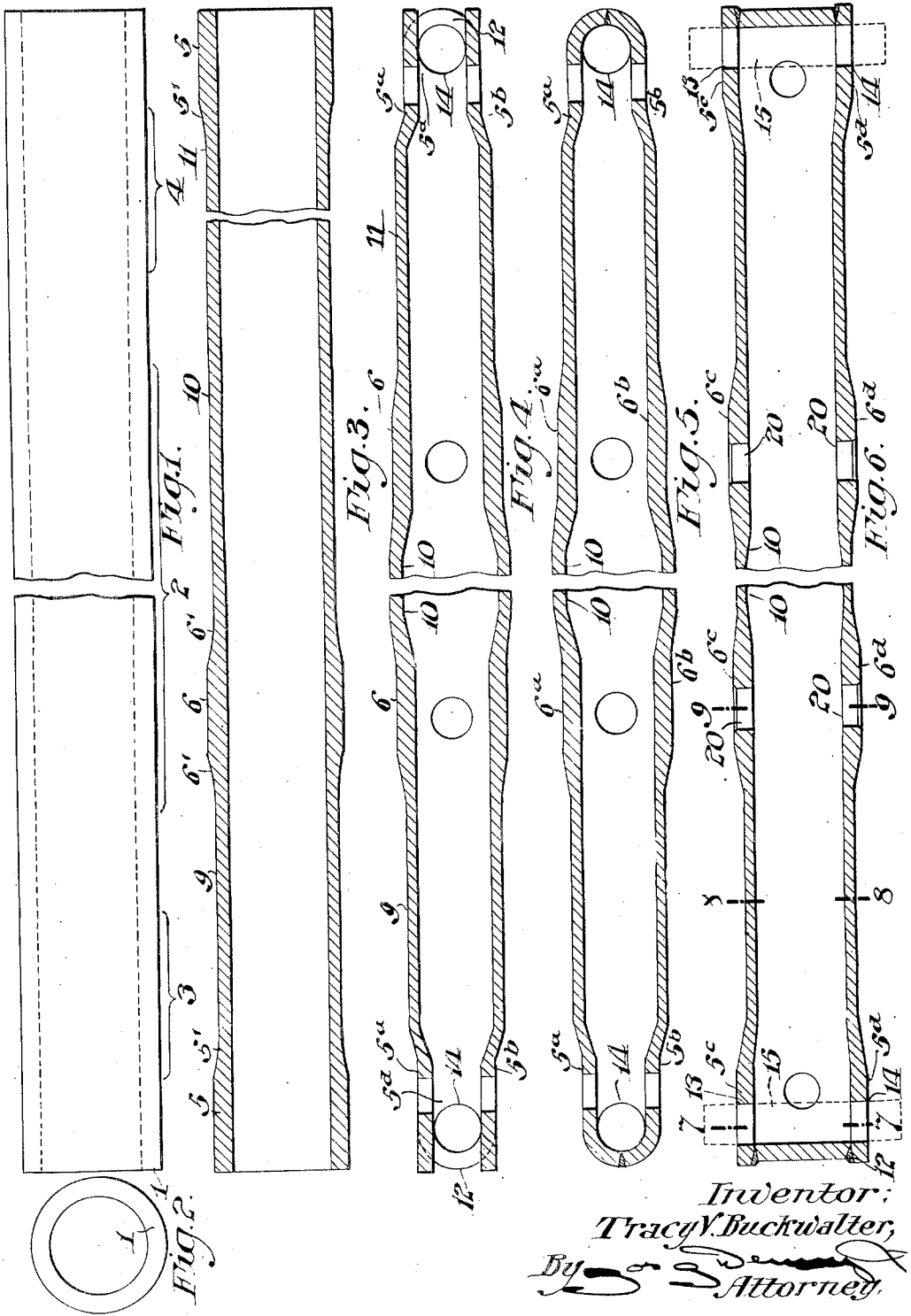
Inventor:
Tracy V. Buckwalter,
By
Attorney.

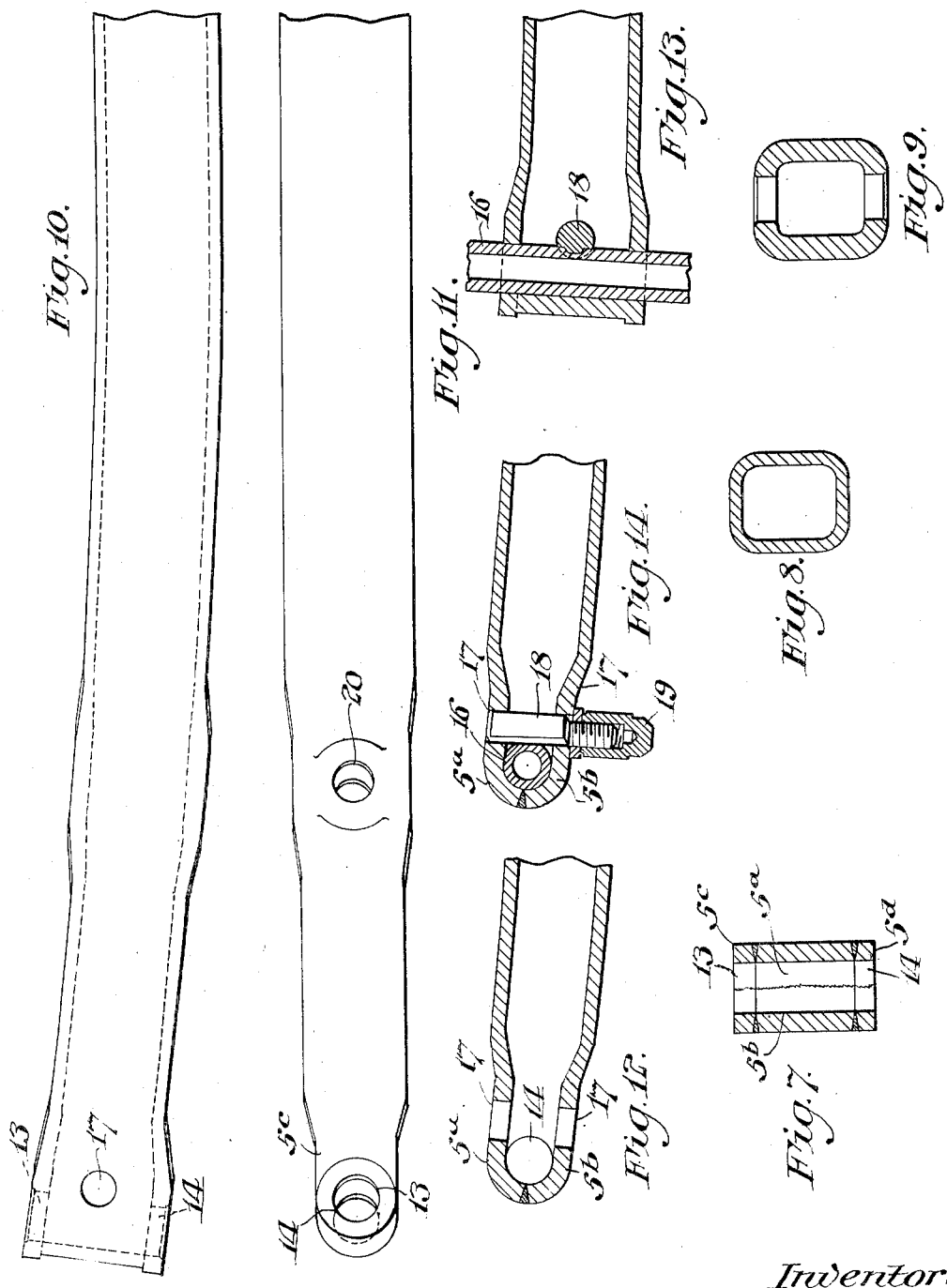

Patented Jan. 7, 1941

2,227,436

UNITED STATES PATENT OFFICE 2,227,436

METHOD OF MAKING AXLES

Tracy V. Buckwalter, Canton, Ohio, assignor to The Timken Roller Bearing Company, Canton, Ohio, a corporation of Ohio Application June 10, 1931, Serial No. 543,285

4 Claims. (Cl. 29—153)

My invention is an improved axle and method of making the same, preferably from hot rolled tube stock, and a leading object of my invention is the economical provision of a tubular axle having metal so distributed and the axle so shaped that the sections are proportionate to the strains imposed thereon and approximately uniform stresses are developed throughout the entire length of the tube notwithstanding the wide variety of application of loads and consequent stresses imposed on the tube.

My improved axle is particularly adapted for automotive use where the end portions of the axle, in addition to sustaining their proportion of the vertical stresses resulting from the application of load and the transverse stresses resulting from road shocks, are subjected to additional stresses imposed by the operation of the steering mechanism and to torsional stresses resulting from the application of front wheel brakes. While load stresses and road stresses are approximately uniform throughout the length of an axle, the stresses due to the braking and steering mechanisms are confined largely to the end portions thereof. Consequently sufficient strength may be provided in the intermediate portion of an axle by a wall of substantially less thickness than the walls of the end portions.

The intermediate portion of my improved axle preferably consists of an elongated tube having a relatively thin wall of substantially circular cross-section. The end portions of my improved axle each consists of spaced seats or sections of substantially rectangular cross section and having walls substantially twice as thick as the intermediate portion of the finished axle and approximating in thickness the original thickness of the tube from which the intermediate section was elongated. These seats on the end portions are preferably spaced by sections which are slightly elongated and which consequently have walls of less thickness than the seats but preferably of somewhat greater thickness than the wall of the intermediate portion of the axle.

The parts of the tube having walls of greatest thickness are drilled for the reception of and form seats for spring bolts and king pins. Lips are formed at the ends of side walls of the king pin seats and are bent and welded to form end closures which, when reamed, provide curved seats for the king pins having a binding effect thereon through an arc of approximately 180°. Hence the king pins are engaged throughout their entire circumferences by the seats formed by the apertures in the top and bottom walls of the king pin seats and throughout half their circumference by the end closures, against which the king pins may be pressed by locking bolts disposed transversely to the axes of the king pins and passing through the side walls of the king pin seats.

Axles embodying my improvements may be economically made at one heat from hot rolled tube stock having a wall thickness approximating that desired for the seats for the king pins and spring bolts. Such stock is initially cut in lengths preferably slightly in excess of one-half the desired length of a finished axle, thereby securing a maximum output of axles proportionately to tube mill capacity and permitting the use of a minimum quantity of metal per axle.

In accordance with my process, the intermediate portion of such a tube section is elongated and the walls thereof reduced in thickness, preferably by rolling. Portions of the tube between the points of attachment of the king pins and spring bolts may also be elongated and the walls thereof reduced in thickness by rolling. The elongation of these three spaced portions of the tube leaves four rings or hoops integral with the elongated portions and having walls approximating the original thickness of the tube, and provides a blank approximating or slightly exceeding the required length of the finished axle.

The end portions of the tubes, including the four ring sections of thick metal, are pressed to a substantially rectangular cross section, and the top and bottom walls of the rectangular sections are drilled to provide bearings for king pins and spring bolts. Parts of the top and bottom walls beyond the king pin apertures may be cut away and the side walls thereby left projecting bent around a plug or former. When welded these bent walls form end closures providing supplementary bearings for the king pins.

The characteristic features and advantages of my improvements will further appear from the following description and the accompanying drawings in illustration thereof.

In the drawings, Fig. 1 shows a section of seamless tubing suitable for the production of an axle in accordance with my invention; Fig. 2 is an end view of the tubing section shown in Fig. 1; Fig. 3 is a longitudinal sectional view of a symmetrical axle blank made by elongating the intermediate portion and parts of the end portions of the tube of Fig. 1, a part of the intermediate portion and a part of one end portion being omitted; Fig. 4 is a horizontal longitudinal sectional view showing the end portions of the axle blank after the ends have been shaped to substantially rectangular cross section, the greater part of the elongated intermediate portion of the tube being omitted; Fig. 5 is a view similar to Fig. 4 but with the ends closed; Fig. 6 is a vertical longitudinal sectional view of the axle blank shown in Fig. 5 but showing in place the plugs on which the ends have been bent; Fig. 7 is a transverse sectional view on the line 7—7 of Fig. 6 with the plug omitted; Fig. 8 is a transverse sectional view on the line 8—8 of Fig. 6; Fig. 9 is a transverse sectional view on the line 9—9 of Fig. 6; Fig. 10 is a side elevation of part of a finished axle; Fig. 11 is a top plan view of part of a finished axle; Fig. 12 is a horizontal sectional view of an end of the finished axle; Fig. 13 is a vertical sectional view of an end of a finished axle with a king pin and its locking bolt in place; and Fig. 14 is a horizontal sectional view showing the end of a finished axle with the king pin and locking bolt in place.

In the production of axles in accordance with my invention from seamless tubing having an external periphery and wall thickness substantially equal to that desired at the spring seats and king pin seats of the finished axle, the tubing is cut into lengths 1 equal to approximately three-fifths of the desired length of the finished axle to be produced.

The hot tube section 1 is rolled down upon a mandrel at the intermediate section 2 and at the sections 3 and 4 adjacent to the ends so as to leave integral rings or hoops 5 at the ends thereof and integral rings or hoops 6 sufficiently removed from the ends to form spring seats having substantially the original thickness of metal. These integral rings or hoops are spaced by the elongated sections 9, 10 and 11. The section 10 is preferably rolled until its wall thickness is substantially one-half the wall thickness of the original tube and the sections 9 and 11 are preferably rolled until the wall thickness thereof is but slightly in excess of the wall thickness of the section 10. The rings of thicker metal and the elongated sections of thinner metal preferably merge into one another along tapered or slightly curved lines 5' and 6'. By the rolling operation, the tube section 1 is elongated, as illustrated in Fig. 3, to a length slightly greater than that of the finished axle. The end portions of the elongated tube, including the rings or hoops 5 and 6, are then pressed or swaged over a former so as to bend such end portions to substantially rectangular shape in cross section. The vertical walls 5a and 5b formed by the metal left in the rings 5 to form king pin seats are pressed toward one another as shown in Fig. 4 and protrude inwardly from the inner surface of the elongated sections 9. The top and bottom horizontal walls 5c and 5d of the king pin seats are cut away along curved lines 12 and the projecting edges of the side walls 5a and 5b are then bent so as to conform with the curvature of the edges 12. The bending of the projecting edges of the walls 5a and 5b is preferably effected by drilling the apertures 13 and 14 in the top and bottom walls of the king pin seats and inserting therein plugs or formers 15 against which the projecting extensions of the walls 5a and 5b may be bent.

The bent lips at the respective ends of the tube are welded to one another and to the top and bottom walls of the king pin seats so as to form integral end closures which provide, together with the apertures 13 and 14, when reamed, suitable seats for the king pins. As will be observed, the king pins 16 are engaged throughout their entire circumference by the seats formed by the apertures 13 and 14 and through 180° of their circumference by the seats formed by the bent closures. Such engagement of the king pins will generally afford adequate security against movement of the king pins, but, if desired, apertures 17 may be drilled in the walls 5a and 5b for the passage of tapered locking bolts 18 which are drawn up by nuts 19 against the king pins 16 to tightly bind them in their seats.

The vertical walls 6a and 6b formed by the metal left in the rings 6 are pressed toward one another so that their inner surfaces protrude inwardly from the inner surface of the elongated section 10 and the top and bottom horizontal walls 6c and 6d formed from the metal left in the rings 6 also protrude inwardly from the surface of the elongated section 10. The walls 6c and 6d are drilled to form apertures 20 for the passage of bolts securing springs, which rest upon the walls 6c protruding slightly above the exterior surfaces of the elongated sections 9 and 10.

Where the motor vehicle construction is such as to render desirable an arcuate axle, the axle may be bent longitudinally, as for instance, to the form of an inverted arch as shown in Fig. 10. When the axles are bent longitudinally, it is preferable that the final reaming of the apertures be done after bending.

As compared with an I-beam type of axle having a comparable strength to resist vertical loads or stresses, my improved axle has about four times the resistance to road shocks of such I-beam axle, its polar section modulus, which resist front wheel brake stresses, is about ten times stronger in the center section and about three and a half times stronger in the end sections than the I-beam type of axle, the weight of my improved axle is over 20% less than the I-beam axle and almost twice as many of my improved axles can be produced from a tube-mill of given capacity as have been heretofore ordinarily produced therefrom.

Having described my invention, I claim—

1. In the manufacture of axles, the steps which consist in elongating an intermediate portion of a tube and thereby reducing the thickness of the wall of said intermediate portion, elongating a part of each end portion of the tube and thereby reducing the thickness of the walls of such elongated portions and leaving spaced sections on each of said end portions having walls of substantially the thickness of the original tube.

2. In the manufacture of axles, the steps which consist in elongated portions of a tube and thereby reducing the thickness of the walls of the elongated portions while leaving between the elongated portions wall sections having substantially the thickness of the original tube, and shaping the end portions of said tube to substantially rectangular cross section.

3. The method of forming an axle from a tubular blank of appropriate length which comprises elongating three spaced portions of said blank to form sections of smaller external diameter and lesser wall thickness than the original blank, the ends of each of said elongated sections being bounded by seat sections of greater wall thickness than said elongated sections, and pressing said seat sections to form substantially parallel walls for each section, the distance between the top and bottom external surfaces of each seat section after pressing said sections being greater than the diametral distance between the top and bottom external surfaces of any of said elongated sections.

4. The method of forming an axle from a tubular blank of appropriate length which comprises rolling three spaced portions of said blank to form sections of smaller external diameter and lesser wall thickness than the original blank, the intermediate rolled section being rolled to a lesser external diameter and a lesser wall thickness than the external diameter and wall thickness of the other two rolled sections, said last named rolled sections being both rolled to substantially the same external diameter and wall thickness, the ends of each of the rolled sections being bounded by seat sections having substantially the same wall thickness and external diameter as the original blank, and pressing the seat sections to substantially rectangular cross section with the distance between the top and bottom external surfaces of each of said seat sections greater than the diametral distance between the top and bottom external surfaces of any of said rolled sections.

TRACY V. BUCKWALTER.